Oct. 18, 1966  R. F. BRADY  3,279,491
WATER TANK AND AIR RETAINING MEANS THEREFOR
Filed June 17, 1964  2 Sheets-Sheet 1

INVENTOR.
RICHARD F. BRADY
BY
Lockwood, Woodard, Smith & Weikart
Attorneys

Oct. 18, 1966    R. F. BRADY    3,279,491
WATER TANK AND AIR RETAINING MEANS THEREFOR
Filed June 17, 1964                 2 Sheets-Sheet 2

INVENTOR.
RICHARD F. BRADY
BY
Lockwood, Woodard, Smith & Weikart
Attorneys

United States Patent Office 3,279,491
Patented Oct. 18, 1966

3,279,491
WATER TANK AND AIR RETAINING MEANS THEREFOR
Richard F. Brady, Muncie, Ind., assignor to Brady Air Controls, Inc., Muncie, Ind., a corporation of Indiana
Filed June 17, 1964, Ser. No. 375,863
4 Claims. (Cl. 137—192)

This invention relates generally to domestic water supply systems and more particularly to means adapted for use in such systems which will substantially reduce absorption of air by water in the supply tank.

Conventional domestic water supply systems comprise a pump for drawing water from a well and a pressure tank into which water is supplied from the pump. The tank is closed so that as water flows into the tank the air trapped therein creates pressure for supplying water to the home piping system. A pressure responsive switch is provided for starting the pump when the pressure within the tank decreases to 20 lbs. to 40 lbs. per square inch and for stopping the pump when a maximum pressure of 40 lbs. to 60 lbs. per square inch is attained within the tank. More recently the efficiency of domestic water supply systems has been improved by precharging the water tank to an air pressure of approximately 15 lbs. per square inch. The result of this precharging is that approximately twice as much water may be withdrawn from the tank between pumping cycles.

Such precharging creates a new problem in that the precharged pressure can be lost whenever the tank is emptied of water. For example, water may be withdrawn from the tank during a power failure, and if all of the water is withdrawn the precharged air will escape through the piping system. Such loss of air can also occur when the rate of withdrawing water from the tank exceeds the capacity of the pump. Under this condition the pump may run continuously and yet the tank may be completely emptied of water so that the precharged air may escape from the tank.

Further in connection with the precharging technique, the conventional practice is to install the water system including the tank and then precharge the tank with air to a pressure of approximately 15 lbs. per square inch. This requires that the installer be equipped with some sort of an air pumping device, such as a hand operated pump or a power operated pump. In either case the precharging operation extends the time required for installation of the system and increases the installation expense. Accordingly, there would be substantially saving if the tank could be precharged with air by the manufacturer.

There is a still further problem connected with precharging tanks in that air is absorbed by the water in the tank over a period of time which also tends to exhaust the precharged air and, in fact, to exhaust all of the air trapped in the tank. In order to maintain the increased efficiency resulting from precharging it becomes increasingly important to provide means for decreasing the air absorption to the maximum possible extent. Mechanical devices and oil films have been provided as means for minimizing exposure of the water in the tank to the air in the tank. The conventional mechanical devices comprises floating discs and expansible rubber liners. These devices are subject to the corrosive effects of water and, hence, their useful life is limited. Oil films are fairly satisfactory, but water turbulence oftentimes breaks up the films so that the water is exposed to the air during pumping cycles, and in some cases, the oil films may be disintegrated into droplets which can flow out of the tank with the water. Accordingly, conventional devices for preventing air absorption are somewhat unsatisfactory, and recharging of the tank with air is necessary at rather frequent intervals.

The principal object of this invention is to provide means for preventing escape of air from precharged water tanks and for preventing absorption of air by the water to such a degree that a domestic water system may be operated over a period of as much as 12 years without recharging the supply tank with air.

Another object of this invention is to provide in a water tank for domestic water systems a check valve in the tank outlet so that the tank may be precharged with air by the manufacturer.

Still another object of this invention is to provide in a water tank for domestic water systems a check valve in the tank outlet operable to prevent escape of air from the tank whenever the water level recedes to the level of the outlet.

A further object of the invention is to provide in a water tank for a domestic water system a means operable to prevent water turbulence when the water is being pumped into the tank, thereby to reduce air absorption by the water.

In accordance with this invention there is provided in a water supply system a closed supply tank having a float controlled valve closing the inlet-outlet of said tank and a baffle means disposed in the path of inward flow of water for creating balanced opposed pressures vertically and horizontally of said inlet-outlet, thereby to minimize water turbulence at the water surface.

The full nature of the invention will be understood from the accompanying drawings and the following description and the claims:

Figure 1:
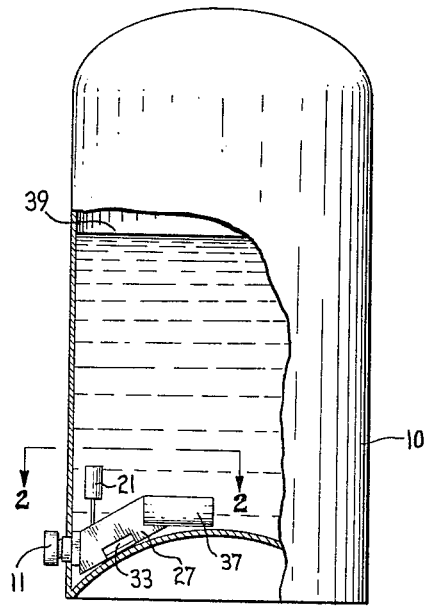
FIG. 1 is a side elevation, with parts broken away, illustrating a domestic water supply tank having a float valve and baffle means as provided in accordance with this invention.
Figure 2:
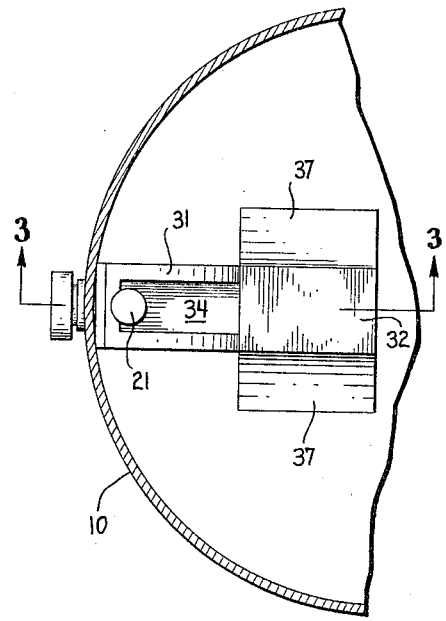
FIG. 2 is an enlarged top plan view of the valve and baffle means taken on line 2—2 of FIG. 1.

In accordance with this invention there is provided a pressurized storage tank 10 having a tubular inlet-outlet coupling member 11 mounted adjacent the bottom of the tank and projecting from the exterior of the tank into the interior of the tank. The coupling member includes a female threaded portion 12 for receiving a pipe connection (not shown) which may have a common connection to a water pump and also to a piping system for distributing water to the plumbing of a home. Thus, water may be supplied to the tank from the pump and withdrawn from the tank when a faucet or other valve in the plumbing system is opened. The member 12 may be secured to the tank in sealed relation thereto by means of a threaded collar 14 mounted on the threaded male portion 15 so that the collar may be screwed into sealing relation at 16 with the interior surface of the tank.

For opening and closing the inlet-outlet there is provided a float controlled check valve 17 pivotally mounted at 18 to the inner end of inlet-outlet member 11. The inner end of member 11 is formed to have a sloping configuration at 20 whereby the valve 17 will seat on the inlet-outlet member before it moves to a perpendicular position. This sloping or angular configuration 20 causes valve 17 to close itself as it approaches its seated position, even though the flow of water out of the tank may be extremely slow as in the case of a leaking faucet.

Figure 3:
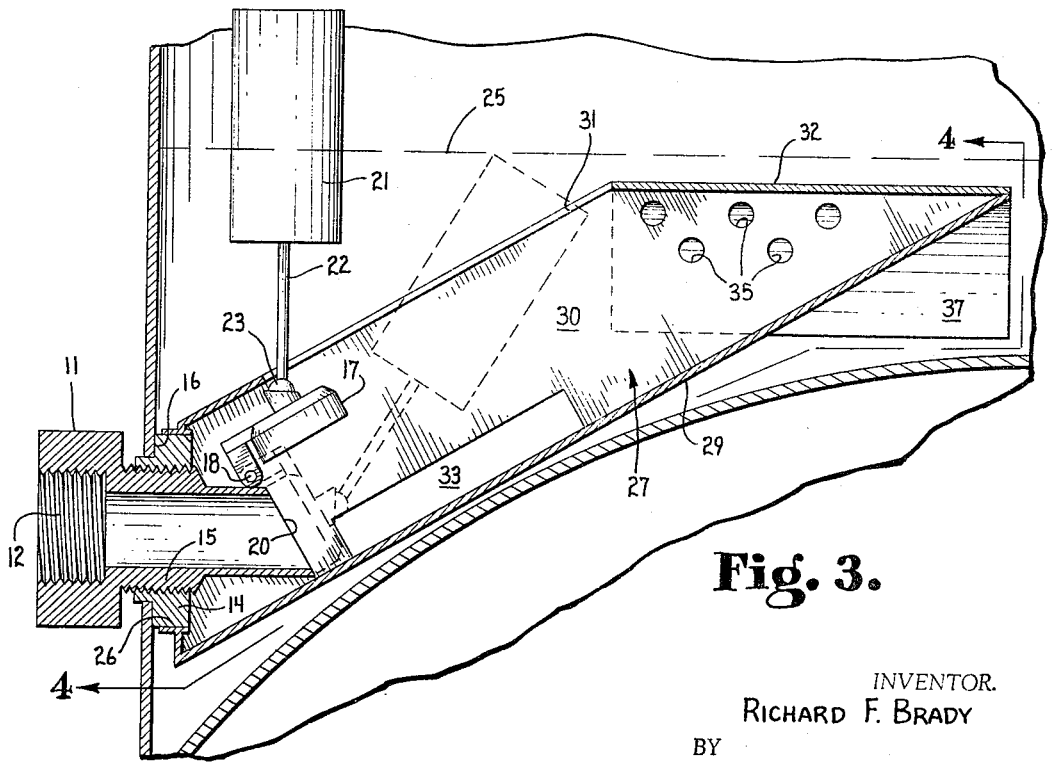
FIG. 3 is an enlarged cross section of the valve and baffle taken on line 3—3 of FIG. 2.
Figure 4:
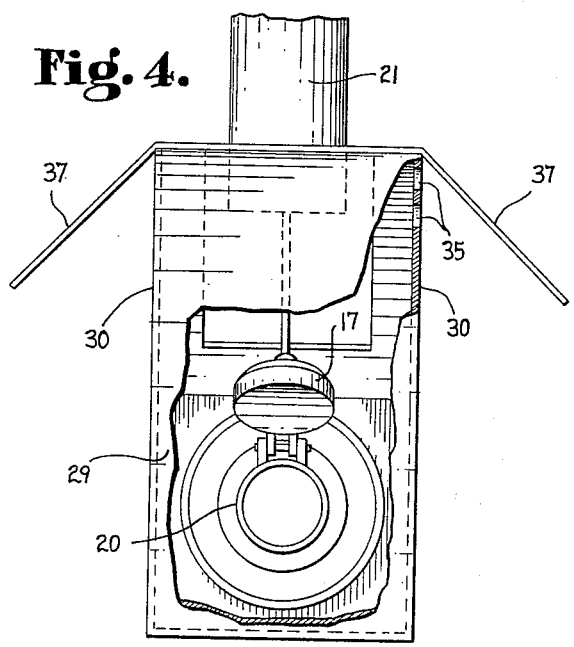
FIG. 4 is a view taken approximately on line 4—4 of FIG. 3 with a portion of the bottom plate of the baffle broken away.

Valve 17 is controlled by a float 21 connected to valve 17 by means of rod 22 and a ball and socket member 23. When the level of the water is above the line 25, float 21 assumes the full-line position shown in FIG. 3. When the water level in the tank recedes below line 25, the float approaches the position illustrated in dotted lines in FIG. 3. The ball and socket joint permits the complete assembly of member 11 and the float and valve to be screwed into collar 14 after the tank and diffuser are assembled. The ball and socket joint also allows valve 17 to assume its closed position, even though the float does not move to a position lower than that indicated by the dotted lines. As previously mentioned, the valve 17 is self-closing, even though the outward flow of water may be very slow, and the ball and socket 23 permits this self-closing action, even though the float has not moved to its lowermost position.

For reducing water turbulence to a minimum during inward flow of water there is provided a baffle or flow diffuser 27 fastened in any suitable manner to collar 14 as indicated at 26. The diffuser may be rectangular in cross section and may comprise a bottom plate 29, sidewall members 30, a sloping top 31 and an end plate 32 connecting the upper ends of bottom plate 29 and top member 31. The sidewalls 30 are provided with openings 33 immediately adjacent the valve and the bottom plate 29. These openings provide more or less horizontal or lateral flow out of the diffuser. Since this lateral flow is in opposite directions, whirling action of the water within the tank is prevented.

Top member 31 is provided with an elongated aperture 34 through which float 21 moves upwardly and downwardly. Since aperture 34 must be at the top of the diffuser in order for the float to function, the diffuser must be designed to equalize pressures so that turbulence will not occur at the water surface by reason of induced flow of water through aperture 34. Each of the sidewalls 30 also includes apertures 35 which permit flow of water to a predetermined degree out of the closed end of the diffuser. These apertures are calculated to pass only enough water out of the diffuser so that sufficient pressure is created within the closed end of the diffuser to counteract induced flow of water downwardly through aperture 34. Normally, the current of water coming into the tank through the inlet-outlet would induce downward flow of water through aperture 34, but the aforementioned pressure created within the closed end of the diffuser acts to counteract such induced flow.

The diffuser also includes a pair of outwardly slanting deflector members 37 which deflect flow of water from apertures 35 downwardly toward the bottom of the tank, thereby to prevent turbulence at the surface of the water in the tank.

In order to reduce absorption of air by the water to a minimum, the tank manufacturer or the plumber who installs the water system may put about 1 qt. of any suitable oil in the tank to form an oil film 39 on the water surface. Any type of oil may be used as long as it does not contaminate the water or impart an undesirable flavor to the water. Also, the tank manufacturer or the plumber installing the water system may precharge the tank with air to a pressure of, for example, 15 lbs. per square inch. As previously mentioned, such precharging improves the over-all efficiency of the system by increasing the amount of water drawn from the tank between pumping cycles.

Figure 5:
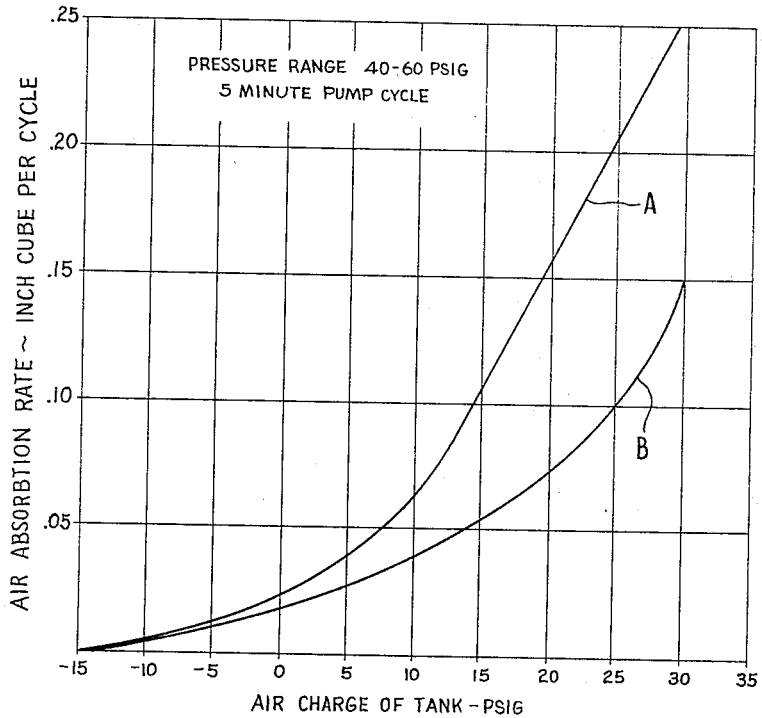
FIG. 5 is a graph illustrating the decreased rate of air absorption which results from this invention.

Referring to FIG. 5 of the drawings, the graph shows, on the abscissa, the degree of precharging in terms of pounds per square inch, and the ordinate shows the air absorption rate in terms of cubic inches per cycle. The curves are plotted for a water system wherein the minimum tank pressure is 40 lbs. per square inch, and the maximum pressure is 60 lbs. per square inch. The curve A illustrates the rate of air absorption where the tank is provided only with an oil seal, and the curve B illustrates the air absorption rate where the tank is provided with an oil seal plus the flow diffusing baffle illustrated in FIGS. 1 to 4. It will be noted that the rate of air absorption is reduced materially when the flow diffusing baffle of this invention is incorporated in the water tank. For a water system wherein the pressure range is 20–40 lbs. per square inch, the data will be different, but the air absorption rate will still be approximately one-half as great when the oil seal and diffuser are used as when the oil seal alone is used.

By providing the float controlled valve of this invention, the tank manufacturer is enabled to precharge the tank to a pressure of approximately 15 lbs. per square inch so that the tank may be installed by the plumber, and it is not necessary for him to have apparatus for precharging the tank. The float controlled valve has the further advantage that it closes whenever the water level reaches a predetermined minimum, for example, about 1½ inches above the inlet-outlet. A power failure can cause reduction of the water level to such a degree or the water level may recede to such a degree when the rate of withdrawing water from the tank exceeds the capacity of the pump. Without such a valve such conditions could cause complete withdrawal of the water from the tank, withdrawal of the oil seal, and loss of the precharge.

The flow diffusing baffle, as provided in accordance with this invention has the effect of causing the water to remain tranquil while the pump is filling the tank. The pressure in the diffuser is so balanced that no appreciable amount of water flows either in or out of the opening 34 in the top member 31 of the diffuser. This pressure balance is determined by the angle at which water hits the end 32 of the baffle and also by the number of holes 35 in the sidewalls of the baffle. The deflectors 37 slow the rate of flow of water out of the diffuser and prevent turbulence at the surface of the water. The holes 33 in the sides 30 of the diffuser provide flow of water in opposite directions around the tank. Such bidirectional flow causes counteraction between the water currents and prevents the occurrence of any whirlpool action. It has been found experimentally that the flow diffuser of this application effectively tranquilizes the water entering the tank when the water level is as low as 1½ inches above the inlet-outlet, and when the rate of flow into the tank is as much as 22 gals. per minute. Where the rate of flow is larger it will be obvious that larger diffusers and air float check valves may be used. It has also been found experimentally that when a tank is not provided with a flow diffuser of this invention, there will be severe turbulence at the water surface regardless of the level of the water within the tank or the rate of water delivery to the tank. Such severe turbulence will cause numerous breaks in the oil film and will cause air absorption by the water to such an extent that a normal period for recharging the tank would be reduced substantially. This invention which combines precharging, an oil seal, and a diffuser, reduces air absorption to the extent that it is necessary to recharge the tank with air only after a period of approximately 12 years. In contrast, experience shows that the normal tank floated on the line requires air after one year of use. An oil film on the water surface reduces air absorption sufficiently to provide a period of approximately three years without addition of air. Addition of a diffuser extends the period to approximately six years.

While the invention has been disclosed in connection with vertical cylindrical water tanks, it will be obvious that the invention is equally applicable to water tanks of the horizontal type, commonly known as "saddle tanks." In such tanks, the diffuser 27 may be mounted in a horizontal position and will function to tranquilize the water entering the tank when the water level is as low as the upper edge of the inner end of the inlet-outlet member 11.

The invention claimed is:

1. In a water supply system, a closed supply tank, an inlet-outlet pipe mounted adjacent the bottom of said tank, a float-controlled valve mounted to said pipe to open and close the end thereof, and a baffle disposed in the path of inward flow of water to minimize water turbulence, said baffle comprising a box-like structure mounted at one end over said valve and having vertical side members formed to provide side openings adjacent said valve, a plate joining the lower edges of said side members and closing the bottom of said structure, a top plate joining the upper edges of said side members and formed to provide an opening through which said float moves upwardly and downwardly, an end plate covering the other end of said structure, said side members having holes adjacent said end plate to provide an adjusted pressure within said structure counteracting induced flow through said float opening, and deflector members disposed in the way of flow through said holes for impeding flow toward the water surface.

2. In a water supply system having a supply tank with an inlet-outlet pipe connected thereto, a flow diffusing means mounted over the end of said pipe within said tank to receive water from said pipe, said flow diffusing means comprising an enclosure mounted at one end over the inner end of said pipe and having side members formed to provide side openings adjacent the inner end of said pipe for creating opposed water currents horizontally of said enclosure to prevent whirling action of the water, a plate joining the lower edges of said side members and closing the bottom of said enclosure, an end plate covering the other end of said enclosure, said side members having holes adjacent said end plate for providing sidewise flow of water out of said enclosure, and deflector members disposed in the way of said sidewise flow for impeding flow of water toward the water surface.

3. In a water supply system, a supply tank precharged with air to a predetermined pressure and with a quantity of oil sufficient to provide a film on the water within said tank for preventing contact of air with water in said tank, an inlet-outlet pipe coupled to said tank, a float-controlled valve mounted on the end of said pipe operable to close said pipe at a predetermined minimum water level for preventing loss of air from said tank, and baffle means mounted in the path of flow of water from said pipe for minimizing water turbulence during flow of water into said tank, said baffle means comprising an enclosure mounted at one end over the inner end of said pipe and having side members formed to provide side openings adjacent the inner end of said pipe for creating opposed water currents horizontally of said enclosure to prevent whirling action of the water, a plate joining the lower edges of said side members and closing the bottom of said enclosure, an end plate covering the other end of said enclosure, said side members having holes adjacent said end plate for providing sidewise flow of water out of said enclosure, and deflector members disposed in the way of said sidewise flow for impeding flow of water toward the water surface.

4. In a water supply system, a supply tank precharged with air to a predetermined pressure, an inlet-outlet pipe coupled to said tank, a float control valve mounted on the end of said pipe operable to close said pipe at a predetermined minimum water level for preventing loss of air from said tank, and baffle means comprising an enclosure mounted at one end over the inner end of said pipe and over said valve, said enclosure being formed to provide an opening through which said float may move upwardly and downwardly and through which inward flow of water may be induced by the stream flowing inwardly through said pipe, said baffle means also being formed to provide a pressure chamber adjacent said float opening for creating a fluid pressure within said chamber sufficient to counteract flow of water inwardly through said float opening.

References Cited by the Examiner

UNITED STATES PATENTS

| | | | |
|---|---|---|---|
| 1,938,956 | 12/1933 | Fee | 103—25 X |
| 2,756,762 | 7/1956 | Nash | 137—448 X |
| 2,972,412 | 2/1961 | Lundeen | 137—192 X |
| 3,078,867 | 2/1963 | McGillis | 137—592 X |

WILLIAM F. O'DEA, *Primary Examiner.*

ALAN COHAN, *Examiner.*